United States Patent [19]

Collins et al.

[11] Patent Number: 5,202,942
[45] Date of Patent: Apr. 13, 1993

[54] CABLE TERMINATION MEMBER FOR FIBER OPTIC CONNECTORS HAVING IMPROVED STRAIN RELIEF

[75] Inventors: Daniel R. Collins, Camp Hill; Thomas R. Fawcett, Jr., Mechanicsburg, both of Pa.

[73] Assignee: AMP Incorporated, Harrisburg, Pa.

[21] Appl. No.: 862,676

[22] Filed: Apr. 3, 1992

[51] Int. Cl.⁵ .............................................. G02B 6/36
[52] U.S. Cl. ........................................ 385/87; 385/86; 385/81
[58] Field of Search ...................... 385/87, 81, 76, 86, 385/56

[56] References Cited

U.S. PATENT DOCUMENTS

| | | | |
|---|---|---|---|
| 4,319,802 | 3/1982 | Bowes | 385/87 X |
| 4,447,121 | 5/1984 | Cooper et al. | 385/87 |
| 4,588,256 | 5/1986 | Onstott et al. | 350/96.21 |
| 4,729,619 | 3/1988 | Blomgren | 350/96.21 |
| 4,815,810 | 3/1989 | Betzler et al. | 385/87 X |
| 4,909,583 | 3/1990 | Williams et al. | 350/96.2 |
| 5,018,316 | 5/1991 | Mulholland | 51/216 R |

Primary Examiner—John D. Lee
Assistant Examiner—Phan T. Heartney
Attorney, Agent, or Firm—Katherine A. Nelson; Driscoll A. Nina, Jr.

[57] ABSTRACT

A cable termination member (10) having improved strain relief features for isolating optical fiber members (21,22) in a terminated optical fiber cable (20) from external stresses. The cable termination member (10) is adapted to terminate an optical fiber cable (20) which includes at least one optical fiber member (21), a load bearing member around the at least one optical fiber member (23) and an outer jacket (24) surrounding the load bearing member (23), and includes a first outer crimp means (38) having a bore for receiving an end of an optical fiber cable (20), a second outer crimp means (39) crimped to the first outer crimp means (38) with an exposed portion of the load bearing member (23) crimped therebetween, and an inner crimp member (41) positioned in the cable (20) between the at least one optical fiber member (21) and the load bearing member (23) and within the first and second outer crimp means (38,39) for securing the cable jacket (24) between the first outer crimp means (38) and the inner crimp member (41). The inner crimp ring or eyelet (41) of the present invention firmly secures both the load bearing member (23) and the jacket (24) of the cable (20) to the termination member (10) to provide improved strain relief for protecting optical fiber members (21,22) within the cable (20) against external stresses.

16 Claims, 3 Drawing Sheets

CABLE TERMINATION MEMBER FOR FIBER OPTIC CONNECTORS HAVING IMPROVED STRAIN RELIEF

BACKGROUND OF THE INVENTION

1. Field of the Invention

The present invention relates generally to the field of optical fiber connectors; and, more particularly, to an optical fiber connector termination having improved strain relief features.

2. Description of the Prior Art

It is desirable that the transfer of light between the optical fibers of mated optical fiber connectors be accomplished with a minimum loss of signal; i.e., with low insertion loss. Insertion loss may result from several factors, including the presence of a gap or separation between the ends of the connected fibers. Specifically, some light is lost if the end faces of two fibers are separated because light diverges as it radiates from the end of a fiber. In addition, fiber to fiber separation results in an insertion loss due to Fresnel reflections at the two glass-air interfaces between the spaced fibers. Accordingly, it is important that end faces of connected fibers be maintained in alignment and in virtual contact with one another to minimize these losses.

In many applications, however, optical fiber connectors can be subjected to severe external stresses which can damage the connectors and cause misalignment or separation of optical fibers mated by the connectors. For example, in applications where connectors are subject to frequent connection and disconnection, stresses placed on an optical fiber cable can loosen or otherwise damage the attachment of the cable to the connector and interfere with the efficient transmission of a signal between the optical fibers of mated connectors.

To protect the optical fibers, and to help maintain the integrity of optical fiber connections, it has become the practice to incorporate strain relief structure into optical fiber connectors to help isolate the delicate optical fibers from external stresses. Examples of strain relief structures for optical fiber connectors are disclosed in U.S. Pat. Nos. 4,588,256; 4,729,619 and 4,909,583.

Optical fiber cables typically include one or more centrally positioned buffer covered optical fibers surrounded by a load bearing member in the form of a plurality of elongated strength members which, in turn, is surrounded and enclosed by a flexible outer jacket. An optical fiber connector is attached to such a cable by attaching a cable termination portion of the connector to an end of the cable.

More particularly, a part of the cable jacket is first cut away to expose a length of the elongated strength members and the optical fibers therein. The exposed end of the cable is inserted into a cable termination member such that the exposed strength members and optical fibers extend outwardly beyond the end of the cable termination member. The strength members are then fanned out and folded back over a first crimp ring positioned around the termination member, and a second crimp ring is then positioned over the foldedback strength members such that the strength members are positioned between the first and second crimp rings. The second crimp ring is then crimped to the first crimp ring to securely anchor the strength members therebetween.

Securing of the strength members of the optical fiber cable to the cable termination portion of the connector in this way assists in isolating, and thus protecting, the optical fibers within the cable from external stresses applied to the cable jacket, for example, during connection and disconnection of mated connectors.

With the above construction, however, the flexible jacket of the optical fiber cable is often not itself very firmly secured to the connector, and an excessive force can loosen or pull it away from the strain relief thus further exposing the strength members and optical fibers in the cable and rendering the optical fibers more susceptible to being damaged.

SUMMARY OF THE INVENTION

The present invention provides an optical fiber cable termination member having improved strain relief features for more firmly securing both the load bearing member and jacket portions of an optical fiber cable to the termination member to thereby more effectively isolate the optical fibers of the cable from external stresses.

A cable termination member of the present invention is particularly designed for use with an optical fiber cable which includes at least one optical fiber member, a load bearing member around the at least one optical fiber member and an outer jacket surrounding the load bearing member, and comprises a first outer crimp means having a bore for receiving an end of the optical fiber cable therein, a second outer crimp means surrounding the first outer crimp means and crimped to the first outer crimp means with an exposed portion of the load bearing member crimped therebetween, and an inner crimp member positioned in the cable between the at least one optical fiber member and the load bearing member and within the first and second outer crimp means for securing the cable jacket between the first outer crimp means and the inner crimp member.

With the present invention, the inner crimp member provides a substantially rigid body within the optical fiber cable which cooperates with the first outer crimp means to more securely retain the cable jacket therebetween so as to help prevent the cable jacket from being pulled loose of the termination member as a result of external stresses applied to the cable. In addition, the inner crimp member serves as a rigid backing for the first and second outer crimp means to permit the first and second outer crimp means to be crimped together more tightly to more securely anchor the load bearing member therebetween. Furthermore, the inner crimp member helps to protect the at least one optical fiber member in the cable from being bent or otherwise damaged during the crimping operation thus facilitating the overall process of attaching of the termination member to the cable.

In accordance with a presently preferred embodiment, the cable termination member comprises a cable termination body having a central bore for receiving the end of an optical fiber cable therein. The first outer crimp means comprises a tubular-shaped portion of the cable termination body and a first outer crimp ring of brass or the like positioned around the tubular-shaped portion. The second outer crimp means comprises a second outer crimp ring of copper or the like which is adapted to be crimped against the first outer crimp ring to secure an exposed portion of the load bearing member therebetween.

The tubular-shaped portion of the cable termination body preferably includes resilient fingers thereon which are pushed inwardly against the cable jacket when the outer crimp rings are crimped together to further assist in securing the cable jacket between the inner crimp member and the tubular-shaped portion of the first outer crimp means.

The inner crimp member preferably comprises a tubular-shaped eyelet of copper or other relatively rigid material having an axial bore for receiving the at least one optical fiber member, and is sized to be easily inserted into the cable between the at least one optical fiber member and the load bearing member. The eyelet preferably also includes an outwardly extending annular flange at the outer end thereof to establish one orientation for insertion of the eyelet into the cable and to provide a smooth transition surface for the one or more optical fibers exiting from the jacket of the cable.

The inner crimp eyelet of the present invention can be incorporated into conventional cable termination members without any retooling of existing parts and can be inserted into the cable quickly and easily during the overall attachment process.

Further advantages and specific details of the invention will be set forth hereinafter in conjunction with the following detailed description of a presently preferred embodiment.

DETAILED DESCRIPTION OF THE PREFERRED EMBODIMENT

Figure 2:
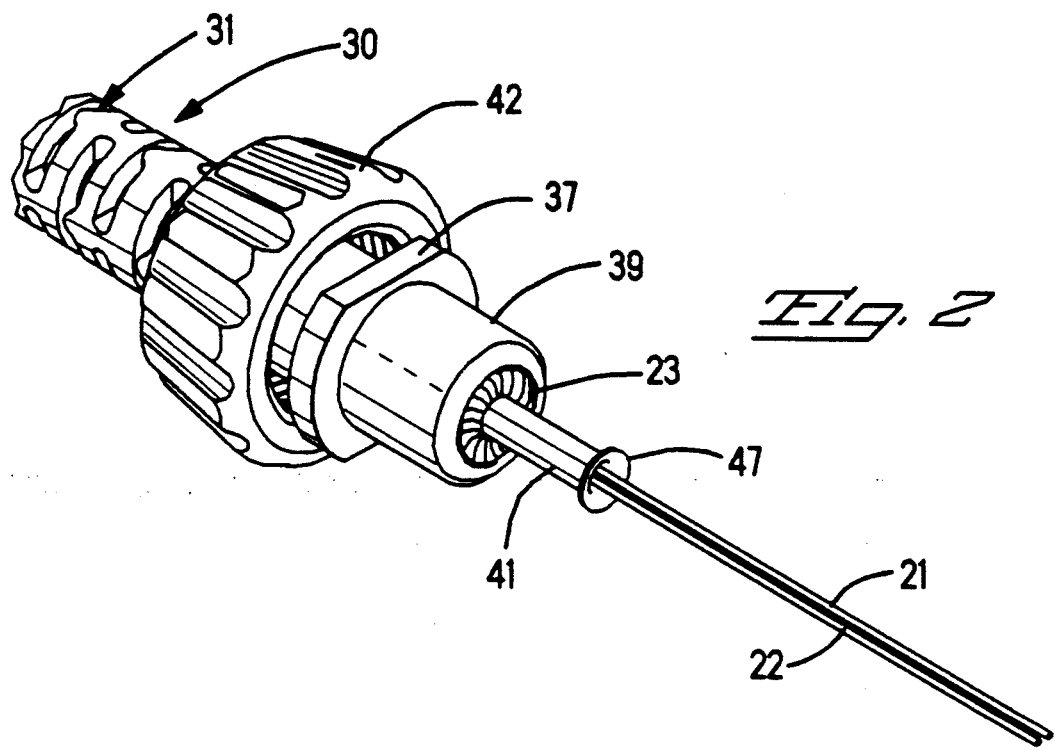
FIG. 2 is a perspective view illustrating the cable termination member of FIG. 1 in the process of being attached to the end of the optical fiber cable.
Figure 3:
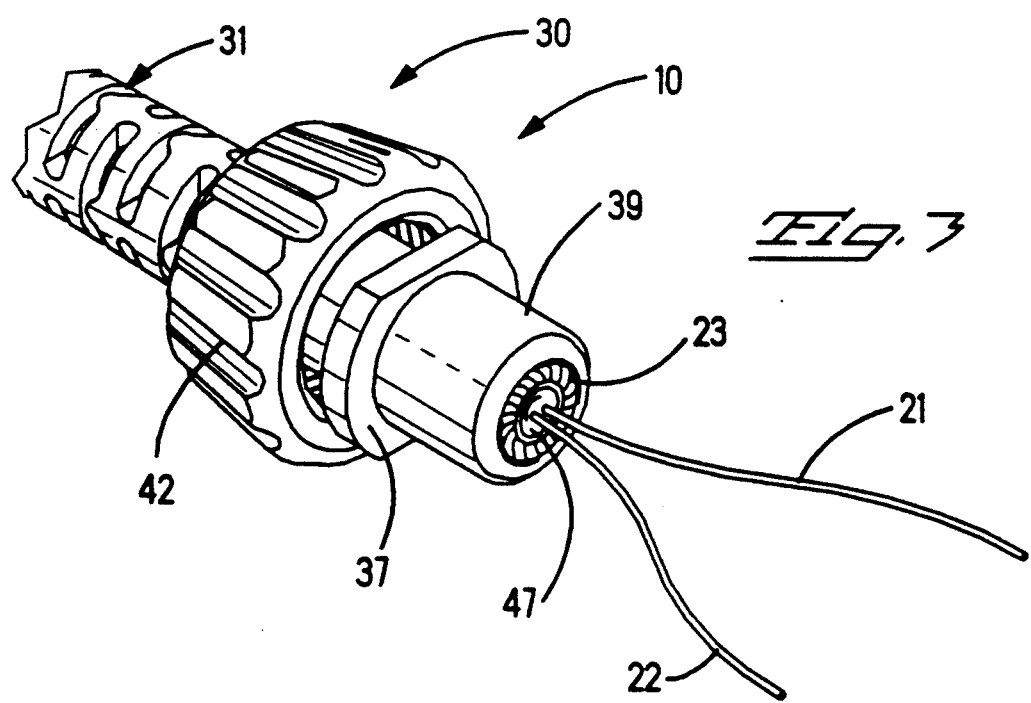
FIG. 3 is a perspective view illustrating the cable termination member of FIGS. 1 and 2 attached to the optical fiber cable.
Figure 4:
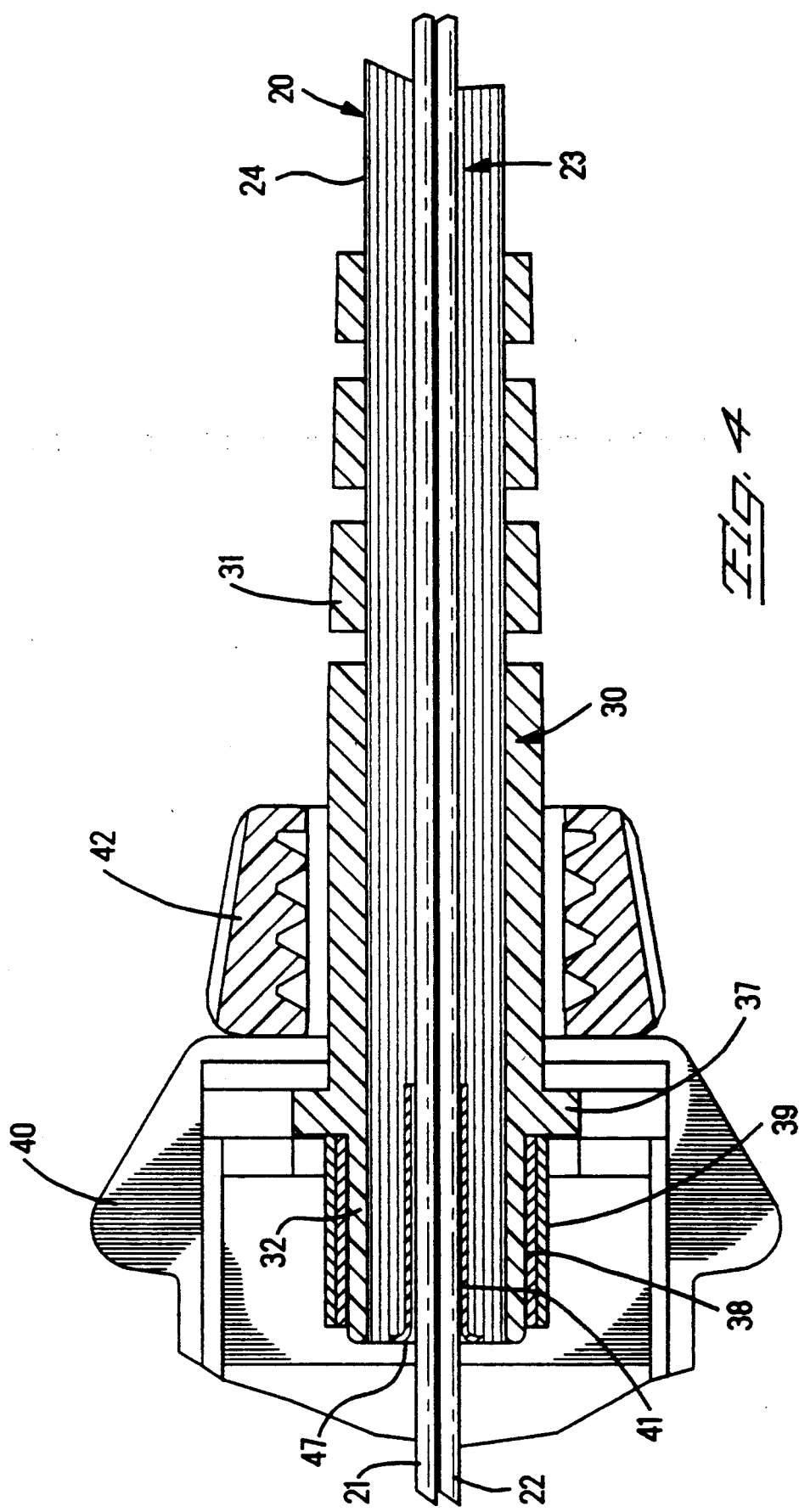
FIG. 4 is a cross-sectional view of the cable termination member of FIGS. 1-3 attached to an optical fiber cable and incorporated in a connector housing.

FIGS. 1-4 illustrate an optical fiber cable termination member 10 incorporating improved strain relief features according to a presently preferred embodiment of the invention, and an optical fiber cable 20 terminated thereby. As known to those skilled in the art, cable termination member 10 comprises a portion of an optical fiber connector, the connector housing 40 of which is illustrated in FIG. 4, which is adapted to be connected to a complementary connector to mate optical fibers in cable 20 to optical fibers of a cable attached to the complementary connector.

In the illustrated embodiment, optical fiber cable 20 carries a pair of optical fiber members 21 and 22 generally centrally within the cable, although the invention is not limited to a cable carrying any particular number of optical fiber members. Optical fiber members 21 and 22 typically comprise individual optical fibers covered by a buffer layer, and are sometimes referred to herein as buffer covered fibers or buffered fibers.

Cable 20 further includes a load bearing portion 23 (which is not shown in FIG. 1 for convenience of illustration) which preferably comprises a plurality of elongated strength members of braided Kevlar fiber or the like that extend lengthwise of the cable and that are distributed over and substantially surround the optical fiber members 21 and 22. In addition, the cable 20 includes a flexible outer jacket 24 of polymeric material which encloses and surrounds the elongated strength members 23.

The cable termination member 10 comprises a generally tubular-shaped cable termination body 30 having a central bore 33 for receiving an end of the optical fiber cable 20. Body 30 includes an elongated, flexible strain-relief body portion 31 extending rearwardly therefrom and encircling the cable 20 as known to those skilled in the art, and a relatively rigid tubular-shaped crimp body portion 32. Cable termination member 30 further includes first and second outer crimp rings 38 and 39, and an inner crimp ring or eyelet 41.

Figure 1:
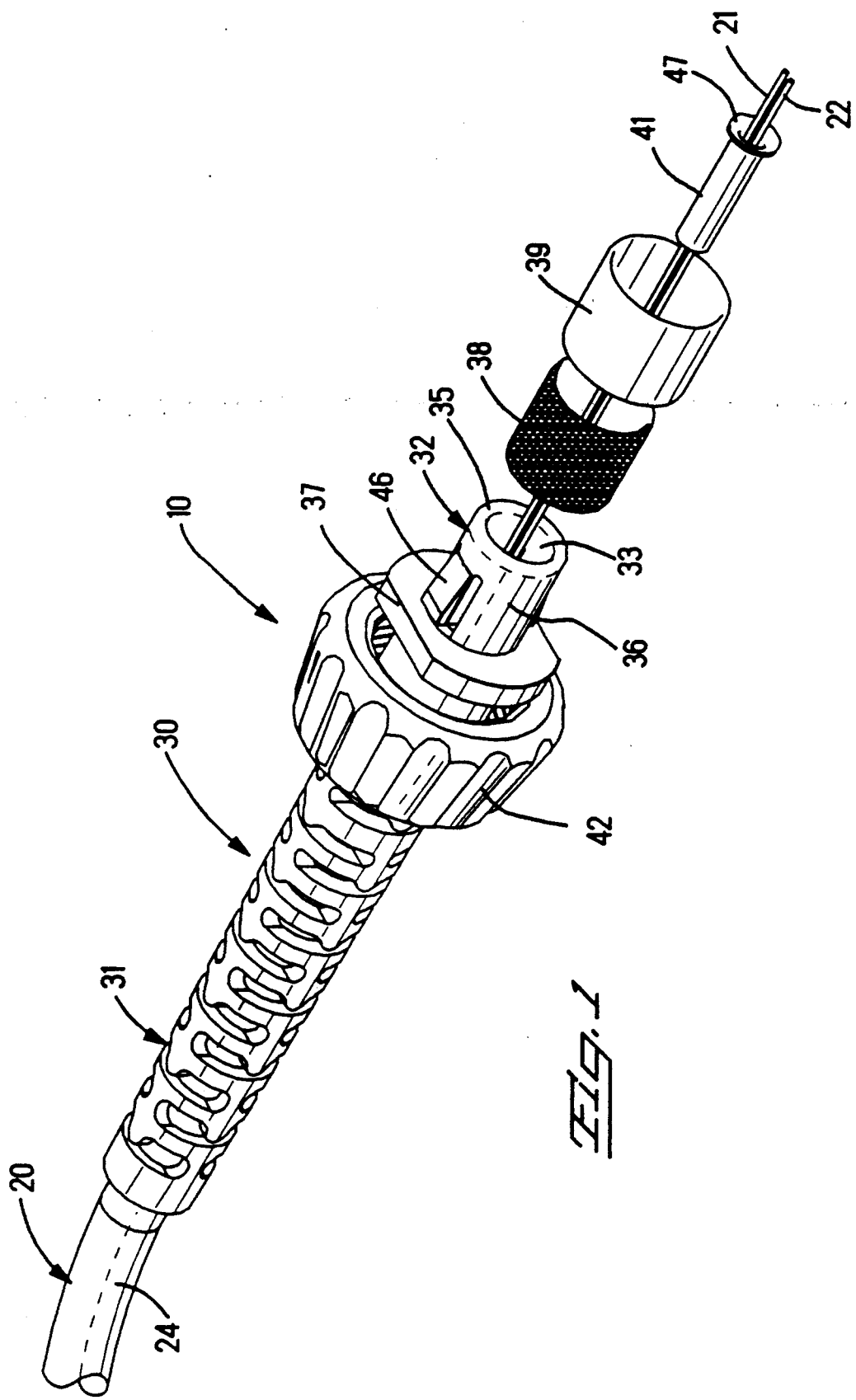
FIG. 1 is an exploded perspective view of an optical fiber cable termination member incorporating improved strain relief features according to a presently preferred embodiment of the invention, and optical fiber cable to be terminated thereby.

With reference in particular to FIGS. 1-3, the procedure for attaching optical fiber cable termination member 10, to an optical fiber cable 20 will now be described. Initially, and preferably after being extended into and through bore 33 of termination body 30, cable 20 is prepared by cutting away a portion of cable jacket 24 to expose a length of the elongated strength members 23 and the buffered fibers 21 and 22 to extend from the end of the jacket 24. The end of the jacket is substantially aligned with the outer end 35 of the crimp body portion 32 of the cable termination body such that the exposed lengths of optical fiber members and strength members extend outwardly beyond the end 35 of crimp body portion 32.

The first outer crimp ring 38, which preferably comprises a substantially rigid ring of brass or the like, is positioned around the outer surface 36 of the tubular-shaped crimp body portion 32, and the strength members 23 are then fanned out and folded rearwardly over the outer surface of the first outer crimp ring 38. The second outer crimp ring 39, which is preferably formed of copper, is then positioned around the first outer crimp ring and over the fanned out strength members such that the strength members are positioned between the first and second outer crimp rings as shown in FIG. 2.

Thereafter, the inner crimp eyelet 41 is positioned around the exposed optical fiber members 21 and 22 and inserted into the end of the cable such that it is positioned between the optical fiber members 21,22 and the strength members 23, and within the first and second outer crimp rings.

The second outer crimp ring 39 is then crimped to the first outer crimp ring 38 with a conventional crimping tool to deform the second outer crimp ring inwardly against the first outer crimp ring to clamp and secure the strength members therebetween to firmly anchor the strength members to the cable termination member as shown in FIG. 3. As shown in FIG. 1, the outer surface of the first outer crimp ring 38 is preferably knurled or otherwise roughened to improve retention of the strength members 23 between the outer crimp rings 38,39.

The cable termination member 10 having cable 20 affixed thereto is then secured within connector housing 40 by tightening connector nut 42 as shown in FIG. 4. Annular outwardly extending flange 37 on body 30 of the cable termination member is provided to secure the termination member to the connector housing.

The inner crimp eyelet 41 of the present invention provides a substantially rigid body within the optical fiber cable which cooperates with the inner surface of the tubular-shaped crimp body portion 32 of cable termination body 30 to firmly secure the cable jacket therebetween so as to help prevent the jacket from being pulled loose of the cable termination member as a result of external stresses, particularly longitudinal stresses, applied to the cable. This helps protect the integrity of the overall connection between the cable and the termination member, and helps protect the optical fiber members within the cable.

Preferably, the tubular-shaped crimp body portion 32 of cable termination body 30 is formed with a pair of diametrically opposed, flexible finger elements 46, as shown in FIG. 1, which are pushed inwardly against the cable jacket 24 when the outer crimp rings 38,39 are crimped to further secure the flexible jacket to the termination member.

With the inner crimp eyelet 41 of the present invention, the outer jacket 24 of the cable 20 is reliably retained within the termination member against a pulling force against the cable of up to 25 to 30 pounds; whereas, without the inner crimp eyelet, a pulling force of as little as six to ten pounds was often sufficient to cause the jacket 24 to loosen or be pulled free of the termination member.

The inner crimp eyelet 41 also functions as a rigid backing for the first and second outer crimp rings 38,39 when they are crimped together with the strength members 23 therebetween. This permits the outer crimp rings 38,39 to be crimped together more tightly and to thus more securely anchor the strength members 23 therebetween. More particularly, the inner crimp eyelet 41 helps protect the buffered optical fibers 20,21 from being bent or otherwise damaged during the crimping process thus permitting a stronger crimping force to be applied.

The inner crimp eyelet 41 is formed of a relatively rigid material such as copper or the like, and preferably includes an outwardly extending annular flange 47 at the outer end thereof to establish one orientation for installation of the eyelet into the cable, as best seen in FIGS. 1 and 4. The flange 47 is also formed to define a smooth radius with the body of the eyelet to create a smooth transition point for the buffered fibers 21,22 exiting the outer jacket 24 of the cable 20 so as to even further protect the delicate fibers.

While what has been described constitutes a presently most preferred embodiment of the invention, it should be understood that the invention could take numerous other forms. Accordingly, it should be recognized that the invention should be limited only insofar as is required by the scope of the following claims.

We claim:

1. A cable termination member for terminating an optical fiber cable which includes at least one optical fiber member, a load bearing member around said at least one optical fiber member and an outer jacket surrounding the load bearing member, said cable termination member comprising:
a first outer crimp means having a bore for receiving an end of the optical fiber cable therein;
an inner crimp member positioned in said cable between said at least one optical fiber member and said load bearing member and within the first outer crimp means; and
a second outer crimp means surrounding the first outer crimp means and the inner crimp member, said second outer crimp means crimped to the first outer crimp means with an exposed portion of the load bearing member crimped therebetween and securing the cable jacket between the first outer crimp means and the inner crimp member.

2. The cable termination member of claim 1 wherein said inner crimp member comprises an elongated tubular-shaped member having an axial bore for receiving said at least one optical fiber.

3. The cable termination member of claim 2 wherein said inner crimp member includes an annular flange at an outer end thereof from which the at least one optical fiber member extends.

4. The cable termination member of claim 1 wherein said first outer crimp means includes resilient finger means for engaging said jacket of said optical fiber cable to further secure the cable jacket within said termination member.

5. The cable termination member of claim 1 wherein said cable termination member comprises a cable termination body having said bore for receiving an end of the optical fiber cable therein, wherein said first outer crimp means comprises a tubular-shaped portion of said cable termination body and a first outer crimp ring positioned around said tubular-shaped body portion, and wherein said second outer crimp means comprises a second outer crimp ring surrounding the first outer crimp ring.

6. The cable termination member of claim 5 wherein said tubular-shaped body portion includes resilient finger means for being pushed inwardly against said jacket of said optical fiber cable when said first and second outer crimp rings are crimped together to further secure the cable jacket to the termination member.

7. A cable termination member for terminating an optical fiber cable which includes at least one optical fiber member, a plurality of elongated strength members distributed around and substantially surrounding said at least one optical fiber member and an outer jacket surrounding the elongated strength members, said cable termination member comprising:
a cable termination body which includes a tubular-shaped portion having an axial bore extending therethrough for receiving an end of said cable;
a first outer crimp ring positioned around an outer peripheral surface of said tubular-shaped portion;
a second outer crimp ring surrounding said first outer crimp ring and crimped to said first outer crimp ring with an exposed portion of said plurality of strength members crimped therebetween; and
an inner crimp member positioned in said cable between said at least one optical fiber member and said plurality of strength members and aligned with said first and second outer crimp rings to secure the cable jacket between said tubular-shaped portion of said termination body and said inner crimp member.

8. The cable termination member of claim 7 wherein said inner crimp member comprises an elongated tubular-shaped eyelet having an axial bore for receiving said at least one optical fiber member.

9. The cable termination member of claim 8 wherein said tubular-shaped eyelet includes an annular outwardly extending flange at an outer end thereof around said axial bore from which said at least one optical fiber member extend.

10. The cable termination member of claim 7 and further including a pair of resilient diametrically opposed fingers on said tubular-shaped body portion for pressing against said cable jacket when said first and second outer crimp rings are crimped together to further secure the cable jacket within the termination member.

11. A method for attaching a cable termination member to the end of an optical fiber cable which includes at least one optical fiber member, a plurality of elongated strength members distributed around said at least one optical fiber member and an outer jacket surrounding the elongated strength members, said method comprising:

extending said optical fiber cable through a bore in said termination member;

fanning out and folding an exposed portion of said plurality of strength members over an outer peripheral crimp surface of said cable termination member;

positioning a crimp ring around said folded strength members;

inserting an inner crimp member into said cable between said at least one optical fiber member and said strength members and in substantial alignment with said crimp ring; and crimping said crimp ring against said peripheral crimp surface of said cable termination member for anchoring the strengthening members between said crimp ring and said outer peripheral crimp surface and for securing said cable jacket between said inner crimp member and said cable termination member.

12. A cable termination assembly for terminating an optical fiber cable including an optical fiber member, a load bearing member around the optical fiber member, and an outer jacket surrounding the load bearing member, the cable assembly comprising:

a first outer crimp means having a bore adapted for receiving an end of the optical fiber cable therethrough and an outer surface surrounding said bore adapted so that the load bearing member extending through the bore can be folded back onto said outer surface;

a tubular-shaped, radially-rigid inner crimp member adapted to receive the end of the optical fiber member therethrough and further adapted to be positioned between the optical fiber member and the load bearing member within the first outer crimp means; and a crimpable second outer crimp means adapted for surrounding the outer surface of the first outer crimp means and the folded back load bearing member and being further adapted to tightly engage the first outer crimp means when crimped, whereby when the cable termination assembly is assembled with the optical fiber cable and crimped thereto, the outer jacket is engaged by the first outer crimp member in cooperation with the inner crimp member and the folded back load bearing portion is tightly engaged between the first and second outer crimp means.

13. The cable termination assembly of claim 12, wherein the first outer crimp means includes a resilient finger for engaging the outer jacket.

14. The cable termination assembly of claim 12, wherein the first outer crimp means comprises a termination body having a bore for receiving an end of the optical fiber cable therethrough and a tubular-shaped body portion, and a first outer crimp ring adapted to surround said body portion having an outer surface adapted so that when the cable extends through said bore the load bearing member can be folded back onto said outer surface.

15. The cable termination assembly of claim 14, wherein the tubular-shaped body portion has a resilient finger adapted to engage the outer jacket.

16. The cable termination assembly of claim 14, wherein the second outer crimp means is a second outer crimp ring adapted to fit over the outer surface of the first outer crimp ring and the folded back load bearing portion and being further adapted to engage the first outer ring and the load bearing portion therebetween when crimped.

* * * * *